(12) United States Patent
Acharya

(10) Patent No.: US 12,158,882 B1
(45) Date of Patent: Dec. 3, 2024

(54) QUERY BASED METHOD TO DERIVE INSIGHT ABOUT MANUFACTURING OPERATIONS

(71) Applicant: HITACHI, Ltd., Tokyo (JP)

(72) Inventor: Joydeep Acharya, Milpitas, CA (US)

(73) Assignee: HITACHI, Ltd., Tokyo (JP)

( * ) Notice: Subject to any disclaimer, the term of this patent is extended or adjusted under 35 U.S.C. 154(b) by 0 days.

(21) Appl. No.: 18/376,374

(22) Filed: Oct. 3, 2023

(51) Int. Cl.
  *G06F 16/00* (2019.01)
  *G06F 16/242* (2019.01)
  *G06F 16/2457* (2019.01)
  *G06F 40/40* (2020.01)

(52) U.S. Cl.
  CPC .... *G06F 16/2425* (2019.01); *G06F 16/24575* (2019.01); *G06F 40/40* (2020.01)

(58) Field of Classification Search
  None
  See application file for complete search history.

(56) References Cited

U.S. PATENT DOCUMENTS

| | | | |
|---|---|---|---|
| 8,688,727 B1 | 4/2014 | Das et al. | |
| 8,725,732 B1 | 5/2014 | Jeh et al. | |
| 9,411,906 B2 | 8/2016 | Wu et al. | |
| 9,552,394 B2 | 1/2017 | Gopinath et al. | |
| 9,626,966 B2 * | 4/2017 | Berndt | G10L 15/22 |
| 9,928,299 B2 | 3/2018 | Musgrove | |
| 10,437,833 B1 * | 10/2019 | Nguyen | G06N 5/046 |
| 2015/0170653 A1 * | 6/2015 | Berndt | G10L 15/22 |
| | | | 704/275 |
| 2018/0314735 A1 * | 11/2018 | Liu | G06N 20/00 |
| 2019/0278857 A1 * | 9/2019 | Ni | G06F 16/3344 |
| 2020/0159731 A1 * | 5/2020 | Gino | G06F 9/5038 |
| 2021/0109958 A1 * | 4/2021 | Behtash | G06F 18/214 |
| 2021/0141798 A1 * | 5/2021 | Steedman Henderson | |
| | | | G06F 16/3344 |

OTHER PUBLICATIONS https://en.wikipedia.org/wiki/Google_Personalized_Search 2023, retrieved on Sep. 27, 2023.
Chris Hall, "How to build a Semantic Search Engine Using a Knowledge Graph," Aug. 30, 2021 https://www.stardog.com/blog/how-to-build-a-semantic-search-engine-using-a-knowledge-graph/ retrieved on Sep. 27, 2023.

* cited by examiner

*Primary Examiner* — Hasanul Mobin
(74) *Attorney, Agent, or Firm* — Procopio, Cory, Hargreaves & Savitch LLP

(57) ABSTRACT

A method for generating query response comprising receiving, by a processor, an input query from a first user; performing, by the processor, query parsing on the input query to generate a parsed query; determining, by the processor, a query type associated with the parsed query; for the query type being determined as initial query, performing: generating, by the processor, a first follow-up query to the input query based on the parsed query, and generating, by the processor, responses to the parsed query and the first follow-up query; and for the query type being determined as follow-up query to a previous query entered by a second user, performing: performing, by the processor, learning of a query sequence from the previous query to the input query, and generating, by the processor, responses to the parsed query and a second follow-up query.

18 Claims, 14 Drawing Sheets

| Employee | Query | Type | Notes on Query Classification (Initial or Follow Up) | Response |
|---|---|---|---|---|
| Employee A for factory JP1 in Japan | Give me the OEE (Overall Equipment Effectiveness) of Inverter line in the last month | Initial Query | This query is made first time user logs and so it is likely that this is an initial query | 80% |
| | Give me the yield of overall inverter Line in the last month* | Follow up Query | Manufacturing domain knowledge is used to determine this as OEE = Downtime X Yield X Quality, Yield is low | 60% |
| | Plot the yield of all processes in Inverter Line in the last month* | Follow up Query | Obvious from semantics | Line chart |
| | Give me the maintenance logs of process OP670 in Inverter Line in the last month | Follow up Query | Obvious from semantics. But ML model is used to understand the worker intent so that the reason can be learned. E.g. analyze values in the line chart and try to infer why worker picked OP670 (for e.g. maybe it yield value was less than other processes) | Text document |
| | Give me the yield of MOTOR Line in the last month | New Initial Query | Manufacturing domain knowledge is used to determine this. Inverter and MOTOR lines are completely separate in factory F1 and so this can't be a follow up query | 90% |
| Employee B for factory NA2 in USA | Give me the OEE (Overall Equipment Effectiveness) of Inverter Line last week | Initial Query | This query is made first time user logs and so it is likely that this is an initial query | 50% + SUPPLEMENTAL INFO* |

FIG. 3

| Query | Subject | KPI | Time Range |
|---|---|---|---|
| Give me the OEE (Overall Equipment Effectiveness) of Inverter Line in the last month | Inverter Line of factory JP1 | OEE | (month, day-30, year) - (month, day, year) |
| Give me the OEE (Overall Equipment Effectiveness) of Inverter Line | Inverter Line of factory JP1 | OEE | System defined default value (like 1 week) |
| Plot the yield of all processes in Inverter Line in the last week | All processes in Inverter line | Yield | (month, day-7, year) - (month, day, year) |
| Tell me how my factory is doing | Since "my factory" is generic, use system defined default values like all major lines within factory | Since "how" and "is doing" is generic, use system defined default values like all major KPIs | System defined default value (like 1 week) |

FIG. 7

| Field | Value |
|---|---|
| Process Name | OP 670 |
| Type | Automated |
| Executed By | Equipment ID M007 |
| Line | MOTOR |
| Factory | JHPT1 |
| Previous Process | OP 665, OP 663 |
| Next Process | OP 671 (primary), OP 672 (secondary) |

FIG. 8

| Field | Value |
|---|---|
| Process Name | OP 550 |
| Type | Manual |
| Executed By | Worker |
| Line | CHASSIS |
| Factory | JHPT1 |
| Previous Process | OP 549 |
| Next Process | OP 551 (primary), OP 552 (secondary) |

FIG. 9

QUERY BASED METHOD TO DERIVE INSIGHT ABOUT MANUFACTURING OPERATIONS

BACKGROUND

Field

The present disclosure is generally directed to a method and a system for generating query response.

Related Art

Manufacturing operations constitute a complex inter-relationship of OT (operation technology) processes that span across large geographic areas. Such OT processes may include operating processes that occur inside a factory (e.g., maintenance, quality, production, etc.) and operating processes that occur outside the factory (e.g., supply chain, logistics, procurement, etc.) These processes are typically monitored by a combination of manual and automated methods, and data is collected and stored in IT (information technology) databases. These databases may be distributed across a number of factory sites and the cloud, and stored in a variety of formats from structured (e.g., machine data, documents) to unstructured (e.g., video, sensor data). Data availability could also be partial for some of these processes, as not all collectable data is collected.

The IT databases are then made available to the appropriate OT stakeholders, which may include maintenance manager, operations manager, chief executive officer (CEO), etc. The stored data can be viewed on dashboards, which receive notifications and draw insights about the state of operations in the factory. Depending on the nature of their jobs, the OT stakeholder may be interested in different types of data or the insights that can be derived from them.

Getting satisfactory insights from manufacturing data is not an easy task. The insights that the OT stakeholders wish to retrieve do not have one to one correspondence with one or more IT data sources, which requires the OT stakeholders to view and search over numerous dashboards in search for the data they need. However, data searching itself is a challenging task to an OT stakeholder who is not well versed in how the data is structured or stored in an IT database.

In the related art, a method for generating related queries based on semantic search is disclosed. Such method searches for semantically similar words and generates associated queries as output to a user. However, context of input query can be lost while performing semantic search and the method is incapable of predicting follow-up queries to the input query.

The need exists for methods and systems that are capable of seamless derivation of OT insights.

SUMMARY

Aspects of the present disclosure involve an innovative method for generating query response. The method may include receiving, by a processor, an input query from a first user; performing, by the processor, query parsing on the input query to generate a parsed query; determining, by the processor, a query type associated with the parsed query; for the query type being determined as initial query, performing: generating, by the processor, a first follow-up query to the input query based on the parsed query, and generating, by the processor, responses to the parsed query and the first follow-up query, and displaying the responses to the parsed query and the first follow-up query on a graphic user interface (GUI); and for the query type being determined as follow-up query to a previous query entered by a second user, performing: performing, by the processor, learning of a query sequence from the previous query to the input query, generating, by the processor, a second follow-up query to the input query based on the parsed query, and generating, by the processor, responses to the parsed query and the second follow-up query, and displaying the responses to the parsed query and the second follow-up query on the GUI.

Aspects of the present disclosure involve an innovative non-transitory computer readable medium, storing instructions for generating query response. The instructions may include receiving, by a processor, an input query from a first user; performing, by the processor, query parsing on the input query to generate a parsed query; determining, by the processor, a query type associated with the parsed query; for the query type being determined as initial query, performing: generating, by the processor, a first follow-up query to the input query based on the parsed query, and generating, by the processor, responses to the parsed query and the first follow-up query, and displaying the responses to the parsed query and the first follow-up query on a graphic user interface (GUI); and for the query type being determined as follow-up query to a previous query entered by a second user, performing: performing, by the processor, learning of a query sequence from the previous query to the input query, generating, by the processor, a second follow-up query to the input query based on the parsed query, and generating, by the processor, responses to the parsed query and the second follow-up query, and displaying the responses to the parsed query and the second follow-up query on the GUI.

Aspects of the present disclosure involve an innovative server system for generating query response. The method may include receiving, by a processor, an input query from a first user; performing, by the processor, query parsing on the input query to generate a parsed query; determining, by the processor, a query type associated with the parsed query; for the query type being determined as initial query, performing: generating, by the processor, a first follow-up query to the input query based on the parsed query, and generating, by the processor, responses to the parsed query and the first follow-up query, and displaying the responses to the parsed query and the first follow-up query on a graphic user interface (GUI); and for the query type being determined as follow-up query to a previous query entered by a second user, performing: performing, by the processor, learning of a query sequence from the previous query to the input query, generating, by the processor, a second follow-up query to the input query based on the parsed query, and generating, by the processor, responses to the parsed query and the second follow-up query, and displaying the responses to the parsed query and the second follow-up query on the GUI.

Aspects of the present disclosure involve an innovative system for generating query response. The system may include means for receiving an input query from a first user; means for performing query parsing on the input query to generate a parsed query; means for determining a query type associated with the parsed query; for the query type being determined as initial query, performing: means for generating a first follow-up query to the input query based on the parsed query, and means for generating responses to the parsed query and the first follow-up query, and means for displaying the responses to the parsed query and the first follow-up query on a graphic user interface (GUI); and for the query type being determined as follow-up query to a previous query entered by a second user, performing: means for performing learning of a query sequence from the previous query to the input query, means for generating a second follow-up query to the input query based on the parsed query, and means for generating responses to the parsed query and the second follow-up query, and means for displaying the responses to the parsed query and the second follow-up query on the GUI.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 3 illustrates an example application of the manufacturing insights query tool 103, in accordance with an example implementation.

FIG. 7 illustrates an example parsed query table 700, in accordance with an example implementation.

FIG. 8 illustrates an example data structure 800 of a node of the factory knowledge graph database 516, in accordance with an example implementation.

FIG. 9 illustrates an example data structure 900 of a node of the factory knowledge graph database 516, in accordance with an example implementation.

DETAILED DESCRIPTION

Figure 1:
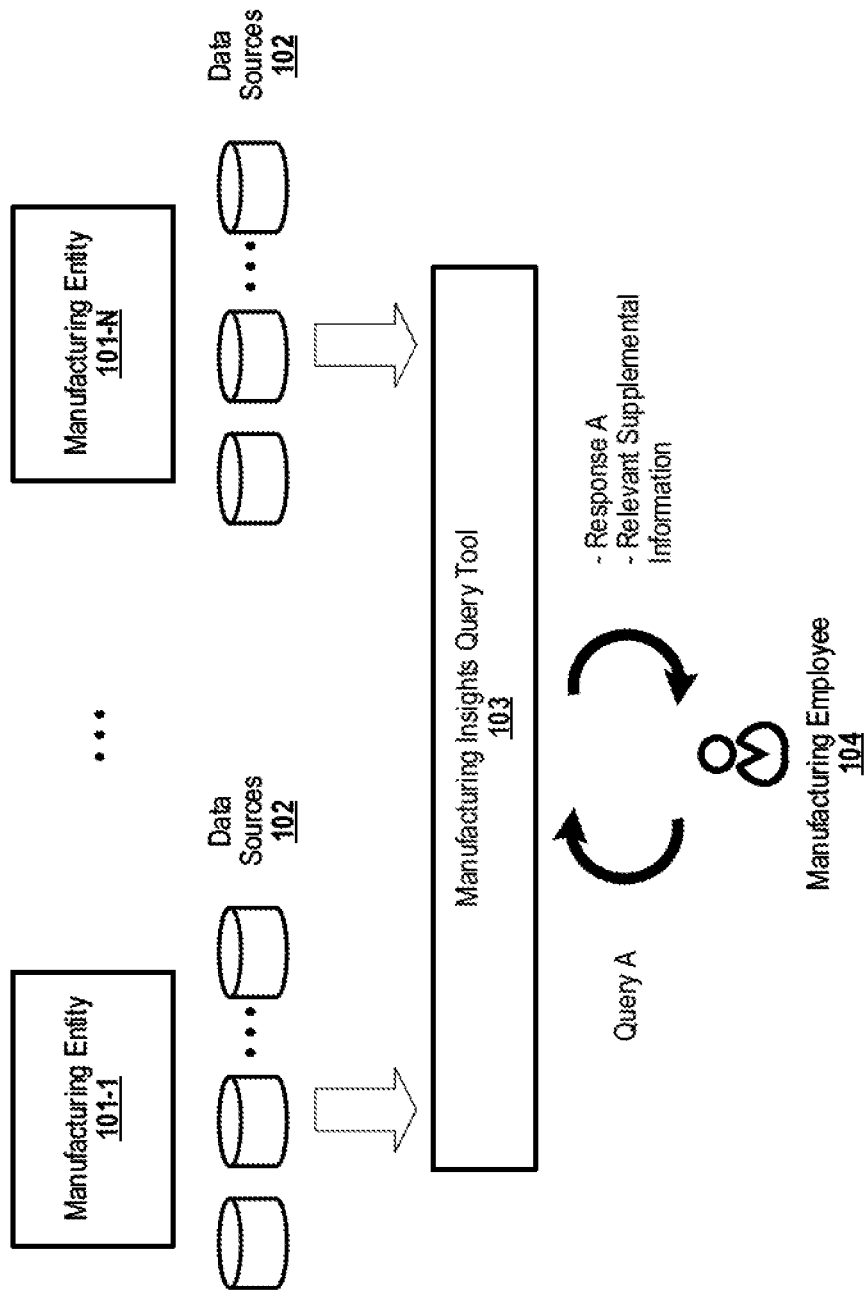
FIG. 1 illustrates an example system environment for performing insight derivation, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be implemented through any means according to the desired implementations.

FIG. 1 illustrates an example system environment for performing insight derivation, in accordance with an example implementation. As illustrated in FIG. 1, a number of manufacturing entities 101 exist (manufacturing entity 101-1 to manufacturing entity 101-N). Each of the manufacturing entities 101 may be a factory, an external warehouse, shipping and logistic system, etc. The various manufacturing entities 101 may represent group factories of a global company that are dispersed in various locations across different continents.

A manufacturing employee 104 is an employee associated with at least one manufacturing entity 101. The manufacturing employee 104 can make a query (query A) to the manufacturing insights query tool 103, which generates a response (response A) and supplemental information to the query. On receiving the query from the manufacturing employee 104, the manufacturing insights query tool 103 queries data sources 102, which store information about the manufacturing entities 101. The insight derivation process is described in more detail below.

An employee (employee A) starts a session by making an initial query to the manufacturing insights query tool 103. Based on the generated response from the manufacturing insights query tool 103, employee A can ask additional query which could be a follow-up query to the initial query or a new initial query. A follow-up query is a query made subsequent to an initial query and seeks for better insight or a more detailed response than what is provided.

During the learning process of the manufacturing insights query tool 103, the manufacturing insights query tool 103 learns to distinguish between follow-up query of an initial query and a new initial query, as well as query sequence between follow-up questions and initial query. The manufacturing insights query tool 103 learns from past queries to infer the relevant follow-up queries to a present initial query, and derives additional insight by finding answers to those relevant follow-up queries and presenting them as supplemental information to the present initial query.

When another employee (employee B) makes an initial query at a later time, the manufacturing insights query tool 103 predicts the relevant follow-up questions to employee B's initial query based on what it had learned during the learning process. Answers to the relevant follow-up questions are then generated by the manufacturing insights query tool 103 as relevant supplemental information.

Figure 2:
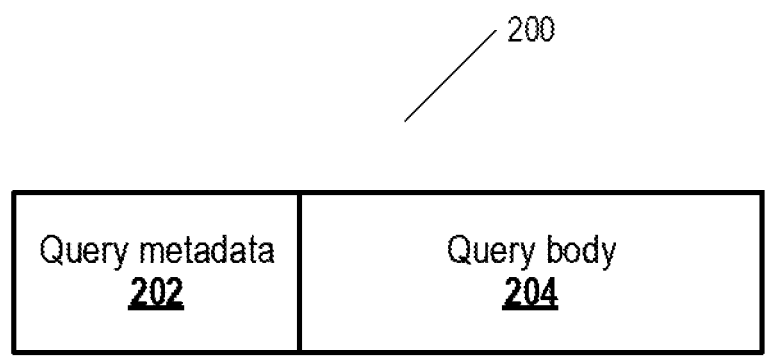
FIG. 2 illustrates an example query 200, in accordance with an example implementation.

FIG. 2 illustrates an example query 200, in accordance with an example implementation. As illustrated in FIG. 2, the query 200 comprises information such as, but not limited to, query metadata 202 and query body 204. The query metadata 202 contains information of the person initiating the query (e.g., the factory the person is associated with, the department the person is associated with, the person's title, etc.) The query body 204 contains the actual query that was entered into the system/tool.

FIG. 3 illustrates an example application of the manufacturing insights query tool 103, in accordance with an example implementation. As illustrated in FIG. 3, interactions with Employee A is used in the learning process, which is then used in generating supplemental information for Employee B during implementation. Supplemental information is relevant information which the query requester can use in finding root cause to a problem identified in input query.

Initial query of "Give me the OEE (Overall Equipment Effectiveness) of inverter line in the last month" is input by employee B into the manufacturing insights query tool 103 situated at a location remote from employee A's location. The OEE is an important key performance indicator used in manufacturing processes and measures the productivity of facilities, processes, and equipment. Using the information and query sequence learned in association with employee A's query, the manufacturing insights query tool 103 returns the value of 50% and extracted supplemental information explaining why the value was low as response to employee B. Examples of the supplemental information may include statements such as: "machine X in INV line was temporarily stopped for routine maintenance for 30 mins in last month." "quality check results for process Y in INV line were 5% less in the last week when compared to the average value," "supplier delay in raw material Z (which is used in ECU line that feeds into the inverter line)," etc.

Figure 4:
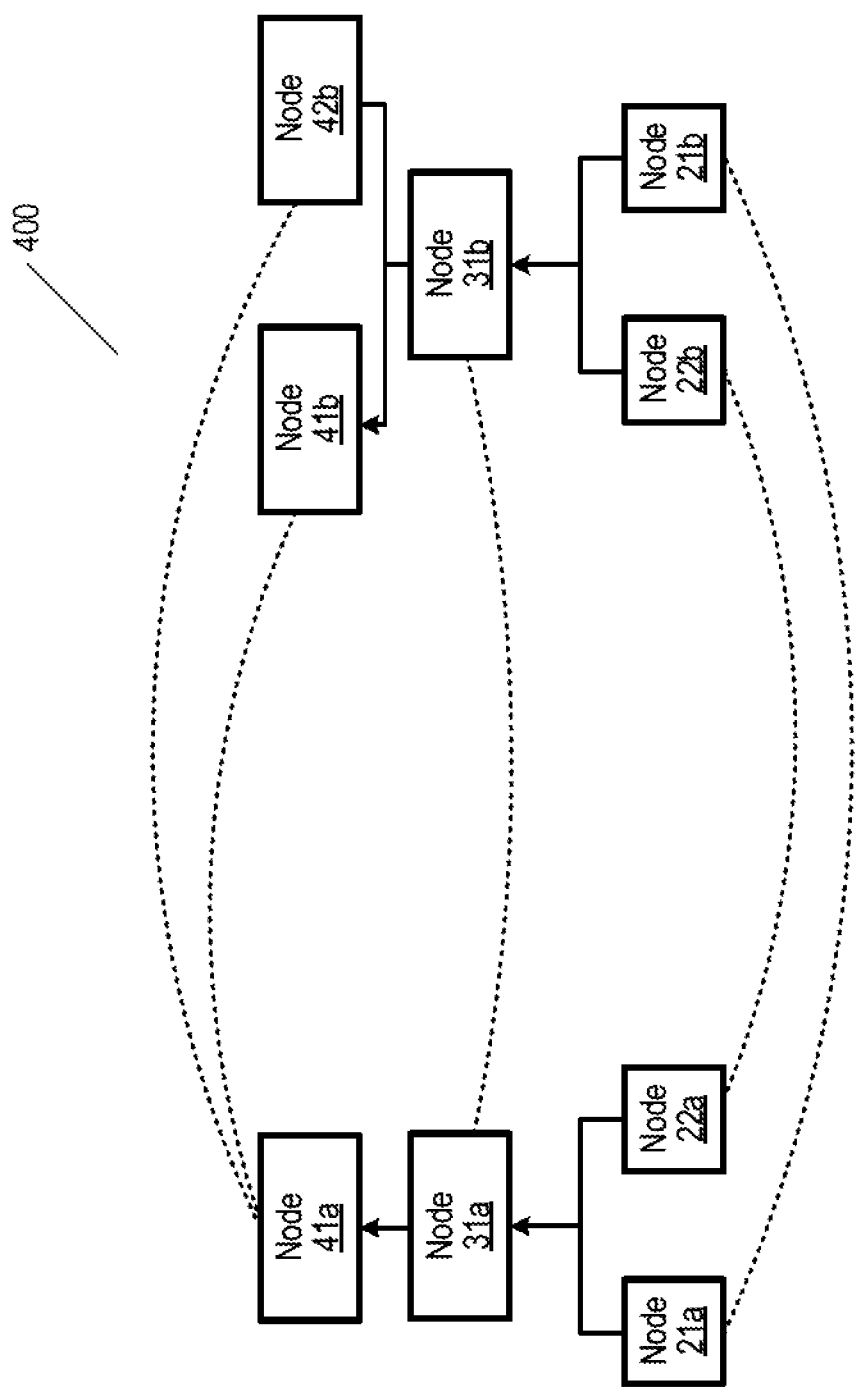
FIG. 4 illustrates an example factory knowledge graph 400, in accordance with an example implementation.

FIG. 4 illustrates an example factory knowledge graph 400, in accordance with an example implementation. The factory knowledge graph 400 maps relationships between various processes and employees for a global company or a company having operations that span across various locations. Application of the factory knowledge graph 400 will be described in more detail below.

The various nodes of the factory knowledge graph 400 determine processes and related information from machines, worker ID, etc. The factory knowledge graph 400 may be made up of a number of distinct trees, where each tree comprises nodes that are directionally connected and nodes across different trees may be indirectly connected.

Nodes having directional connections (e.g., node 21a to node 31a) are based on temporal flow of material/process in a factory. For example, if a part being manufactured first undergoes process A and then process B, then for the manufacturing of that part, there will be a directional connection that leads from process A to process B. Nodes that are indirectly connected (e.g., node 21a and node 21b, node 22a and node 22b, node 31a and node 31b, node 41a and node 41b, and node 41a and node 42b) may be similar or same processes but performed at different sites or lines. Information from human input and existing systems such as enterprise resource planning (ERP), warehouse management system (WMS), manufacturing execution system (MES) are used in building the factory knowledge graph 400.

Figure 5:
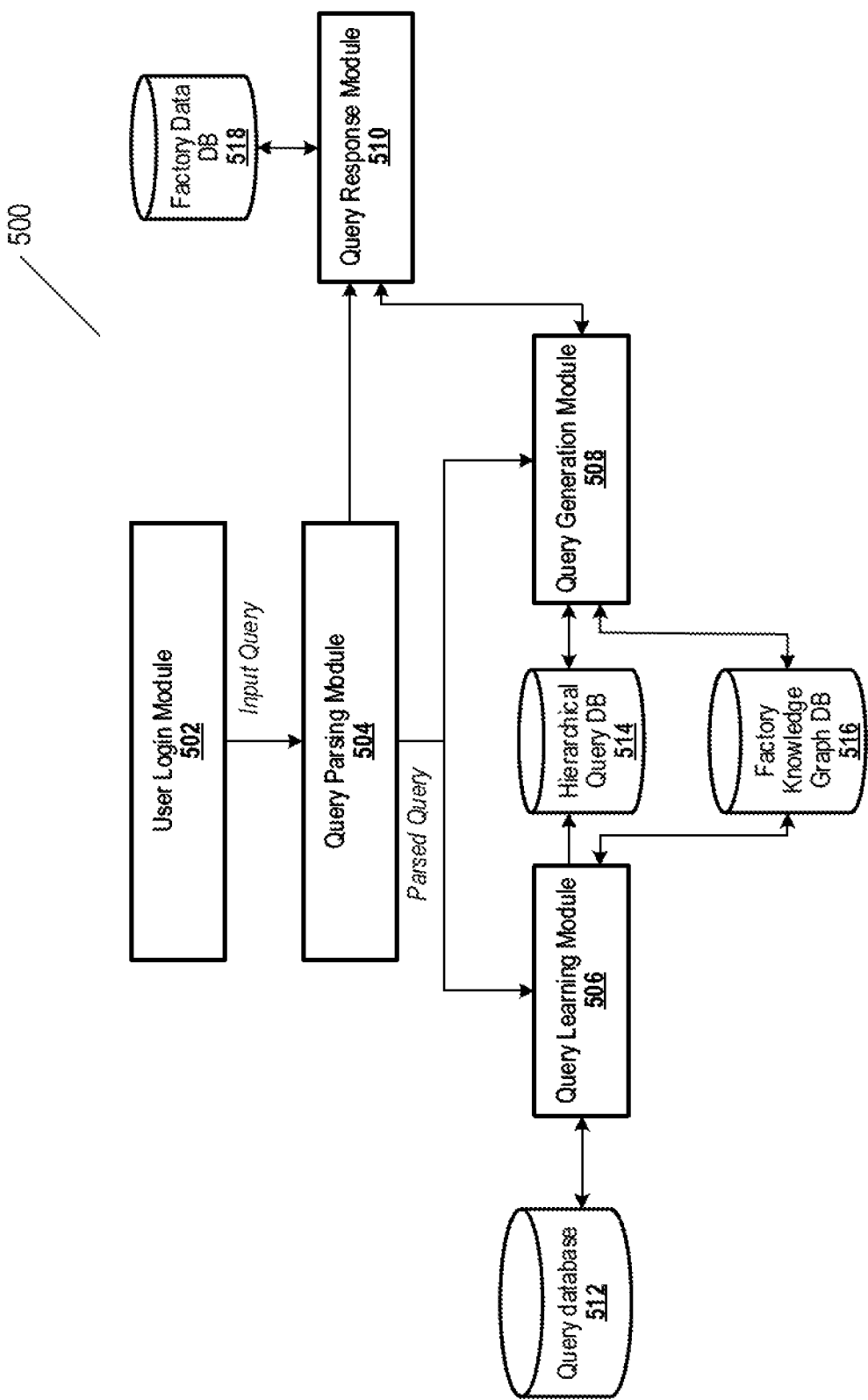
FIG. 5 illustrates an example system configuration 500 of the manufacturing insights query tool 103, in accordance with an example implementation.

FIG. 5 illustrates an example system configuration 500 of the manufacturing insights query tool 103, in accordance with an example implementation. As illustrated in FIG. 5, the manufacturing insights query tool 103 may include a user login module 502, a query parsing module 504, a query learning module 506, a query generation module 508, a query response module 510, a query database 512, a hierarchical query database 514, a factory knowledge graph database 516, and a factory data database 518.

To initiate a session with the manufacturing insights query tool 103, a user logs into the system by entering user login information, which is received and processed by user login module 502. The entered user login information can be used to identify information such as user location, factory location, user title, etc., and the query metadata 202 comprises the user login information. On completion of a session, the user logs out of the system and the session is then terminated.

The query parsing module 504 receives the input query which it then parses using a natural language function to produce parsed query for subsequent processing. The query learning module 506 receives the parsed query as input and determines whether the query is an initial query or a follow-up query to a previous query made by the same user. The query learning module 506 learns the query sequences between follow-up queries and an initial query and stores the learned query sequences and associated queries in the hierarchical query database (DB) 514.

The query generation module 508 generates follow-up queries to the present/input query using the query sequences stored in the hierarchical query database 514. The query response module 510 generates responses to the present/input query and the follow-up queries as identified by the query generation module 508. The query database 512 is a database that stores all query entries made in historical query sessions and is updated whenever a new query or session is imitated.

Figure 15:
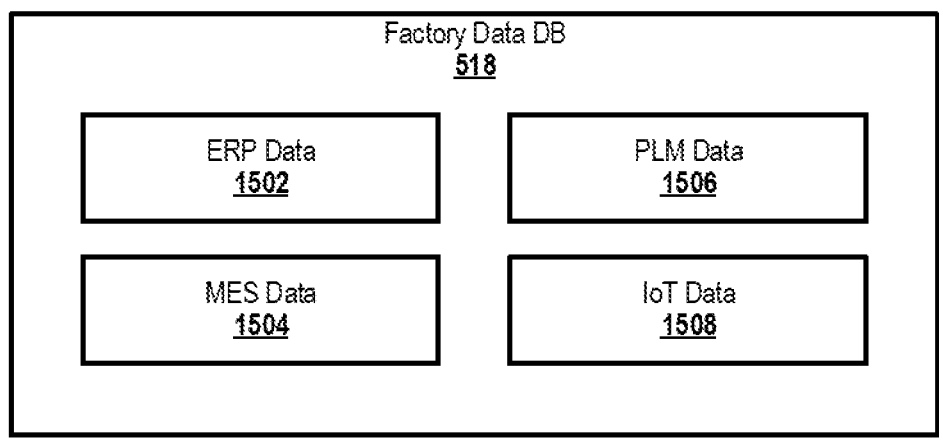
FIG. 15 illustrates an example factory data database 518, in accordance with an example implementation.

The factory knowledge graph database 516 stores information pertaining to the factory knowledge graph 400 as shown FIG. 4. FIG. 15 illustrates an example factory data database 518, in accordance with an example implementation. As illustrated in FIG. 15, the factory data database 518 stores operating data of the factory such as, but not limited to, MES data 1504, ERP data 1502, product lifecycle management (PLM) data 1506, Internet of Things (IoT) data 1508, etc., which are used by the query response module 510 to generate query responses.

Figure 6:
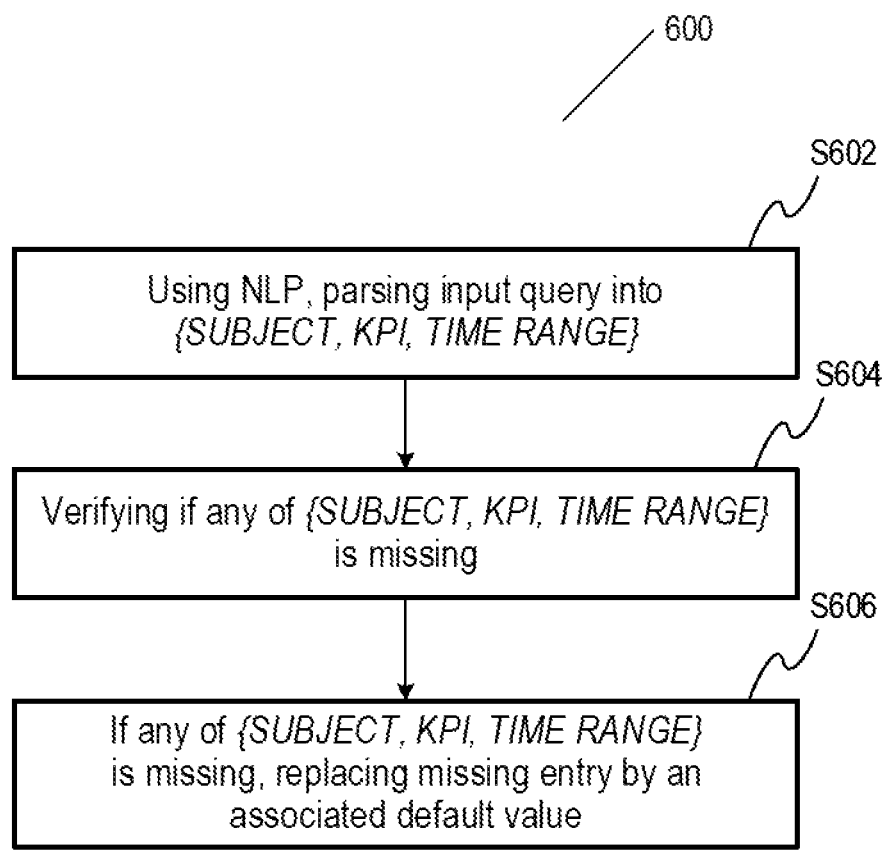
FIG. 6 illustrates an example process flow 600 for processing an input query using the query parsing module 504, in accordance with an example implementation.

FIG. 6 illustrates an example process flow 600 for processing an input query using the query parsing module 504, in accordance with an example implementation. Using natural language processing, the query parsing module 504 takes an input query and extracts/parses it into {subject, KPI, time range} at step S602. At step S604, determining if any of subject, KPI, or time range is missing from the extraction and replacing the missing information/value with an associated default value and using the default value as part of the parsed query at step S606.

FIG. 7 illustrates an example parsed query table 700, in accordance with an example implementation. As illustrated in FIG. 7, the parsed query table 700 stores information such as, but not limited to, query information 702, subject (subject matter) information 704, KPI 706, and time range information 708. The three parameters (subject. KPI, and time range) form the basis of all manufacturing queries. For example, the first query entry ("Give me the OEE (Overall Equipment Effectiveness) of Inverter Line in the last month" of FIG. 3) has the subject information of "inverter line of factory JP1", KPI of "OEE", and time range of "(month, day-30, year)-(month, day, year)". The parsed query table 700 may be stored in a data storage (not illustrated) of the system configuration 500, which can be a local storage or cloud-based storage.

FIG. 8 illustrates an example data structure 800 of a node of the factory knowledge graph database 516, in accordance with an example implementation. The data structure 800 is associated with a node that implements an automated process. The factory knowledge graph database 516 stores information pertaining to nodes contained in the factory knowledge graph 400 as shown FIG. 4.

As illustrated in FIG. 8, the data structure 800 may include field information such as process name, process type, machine executing the process, assembly line, factory identifier, previous process, next process, etc. The value information corresponding to the field information can also be found in the data structure 800. FIG. 9 illustrates an example data structure 900 of a node of the factory knowledge graph database 516, in accordance with an example implementation. The data structure 900 is associated with a node that implements a manual process.

Figure 10:
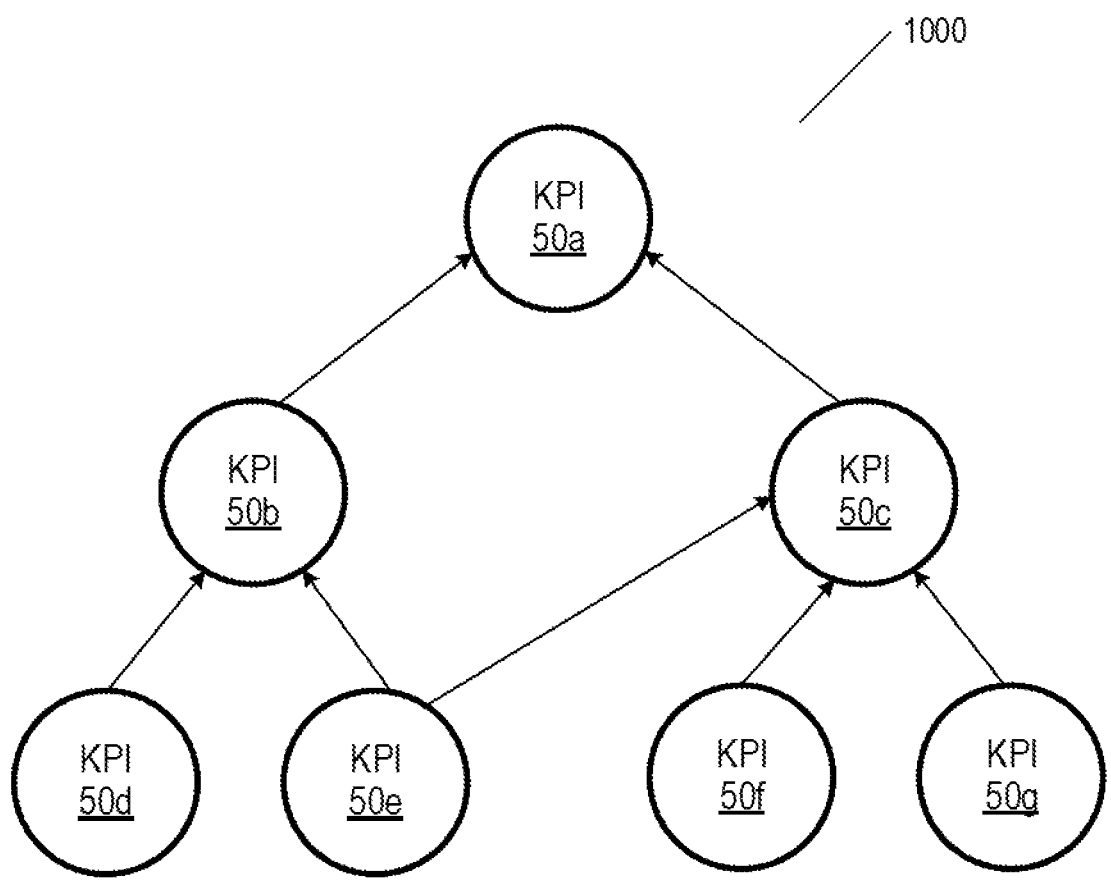
FIG. 10 illustrates an example KPI tree diagram 1000, in accordance with an example implementation.

In addition to the data structures 800 and 900 of FIGS. 8-9, the factory knowledge graph database 516 also maintains information about the KPIs that are relevant to a factory's operations. FIG. 10 illustrates an example KPI tree diagram 1000 of the factory knowledge graph database 516, in accordance with an example implementation. The KPI tree diagram 1000 pertains to KPIs associated with a factory's operations and is stored in the factory knowledge graph database 516. As illustrated in FIG. 10, the KPI tree diagram 1000 may include a parent KPI (KPI 50*a*) and various child KPIs 50*b-g* that are required in computing or deriving the parent KPI. The KPI layers and configurations illustrated in FIG. 10 are illustrative only and are not meant to limit the scope of the invention or any of its embodiments. Using the parent KPI of OEE (Overall Equipment Effectiveness) as example, which is computed as product of three other child KPIS (availability, performance, and quality):

$$OEE = Availability \times Performance \times Quality$$

Figure 11:
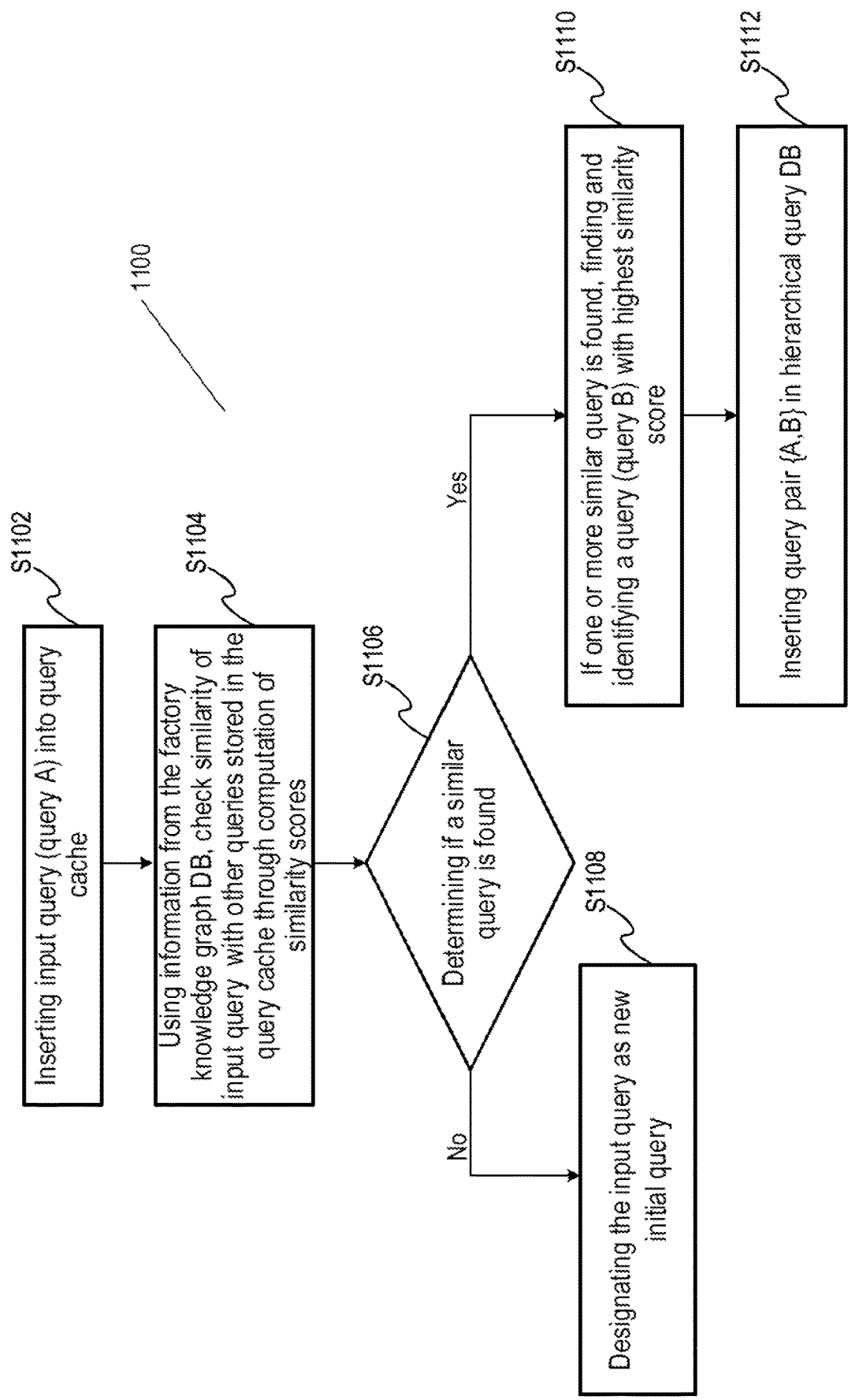
FIG. 11 illustrates an example process flow 1100 for using the query learning module 506, in accordance with an example implementation.

FIG. 11 illustrates an example process flow 1100 for using the query learning module 506, in accordance with an example implementation. At step S1102, the input query (query A) is inserted into the query database 512. In some example implementations, the query database 512 operates on a first-in first-out basis (FIFO). At step S1104, query checking is performed to identify a query, from queries (previous queries) stored in the query database 512, using information from the factory knowledge graph database 516. {SUBJECT, KPI, TIME RANGE} pairs of the previous queries stored in the query database 512 are extracted and used in conjunction with the parsed query to check for query similarity. Similarity checking can be performed in two ways:

Rule-based approach: Consider parsed query (query A)={SUBJECT$_A$, KPI$_A$, TIME RANGE$_A$} and another query (a query stored in the query database 512) as query B={SUBJECT$_B$, KPI$_B$, TIME RANGE$_B$}. The similarity score (Sim Score) is represented by:

$$\text{Sim Score} = \alpha^* \text{dist}(SUBJECT_A, SUBJECT_B) + \beta^* \text{dist}(KPI_A, KPI_B) + \gamma^* \text{dist}(TIME\ RANGE_A, TIME\ RANGE_B)$$

dist(SUBJECT$_A$, SUBJECT$_B$) is computed as distance between nodes containing SUBJECT$_A$ and SUBJECT$_B$ as exhibited in the factory knowledge graph database 516 as shown in FIG. 4 dist(KPI$_A$, KPI$_B$) is computed as distance between two nodes containing KPI$_A$ and KPI$_B$ as exhibited in the factory knowledge graph database 516 as shown in FIG. 10 dist(TIME RANGE$_A$, TIME RANGE$_B$) is computed as the time difference between the starting times of the two different time ranges in association with knowledge graph database 516. In order to compute overall similarity score, weight associated with subject ($\alpha$) should be given the highest weight, and weight assigned to KPI ($\beta$) should be higher than weight assigned to time range ($\gamma$). Such that:

$$\alpha > \beta > \gamma \text{ and } \alpha + \beta + \gamma = 1.$$

In some example implementations, the calculated similarity scores are compared against a similarity threshold for purpose of determining score strength. If a similarity score is equal to or exceeds the similarity threshold, then the input query is considered similar to the previous query associated with the similarity score. If a similarity score is less than the similarity threshold, then the input query is considered not similar to the previous query associated with the similarity score. In some example implementations, the similarity threshold may be adjusted by an operator/user. For example, a higher similarity threshold would be useful in improving similarity accuracy and limit the number of outputs, etc.

Machine Learning (ML) approach: Generalization of the rules-based approach can be achieved utilizing Machine Learning (ML) methods. Under this approach, a domain expert first attributes a list of features for each query contained in the FIFO query database. Such features may include subject, KPI, time range, and any other features such as originating factory, etc. In addition, the domain expert may also manually label a subset of these queries in such a way that queries that the domain expert considers similar are provided with labels that indicate closeness. The label type may be float values or categorical. Using these features and labels, a machine learning model can then be trained to learn similarity between queries based on the identified features. Different types of machine learning algorithms may be utilized, which may include neural network-based classification for categorical labels, regression for continuous value float labels, semi-supervised contrastive learning for separating queries into distinct classes, etc.

At step S1106, a determination is made as to whether a similar query is found. If the answer to step S1106 is no, then the input query is designated as a new initial query at step S1108. If the answer is yes to step S1106, this indicates that one or more similar query has been found, then a query having highest similarity score (query B) from the one or more similar query is identified at step S1110. At step S1112, the query pair {A,B} is inserted into the hierarchical query database 514.

Figure 12:
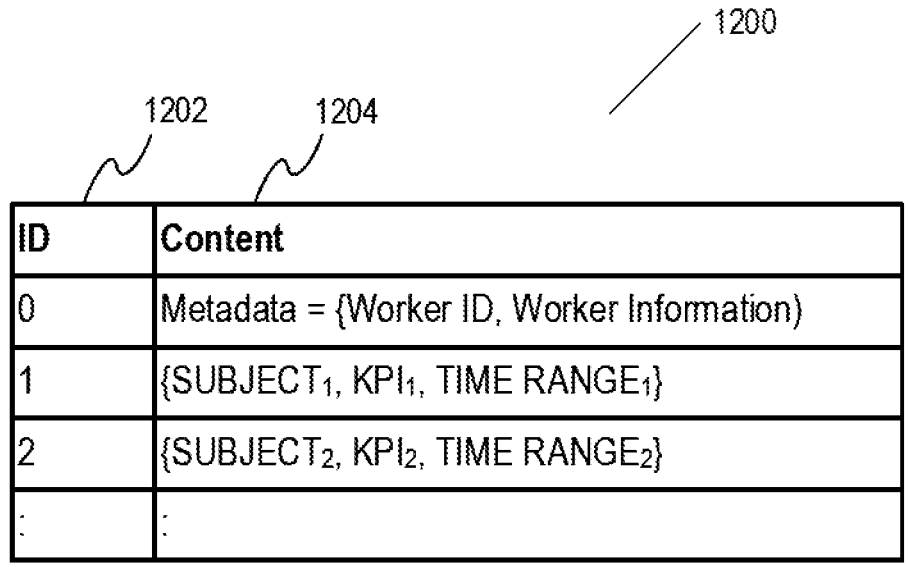
FIG. 12 illustrates an example data structure 1200 of the query database 512, in accordance with an example implementation.

FIG. 12 illustrates an example data structure 1200 of the query database 512, in accordance with an example implementation. The data structure 1200 may include information such as identifier 1202 and content information 1204. As illustrated in FIG. 12, the first entry contains information (metadata) specific to the worker who made the query. At any given time, there are as many instances of query databases as there are active query sessions used by different workers when they access the manufacturing insights query tool 103. Each of the remaining entries of the data structure 1200 captures a set of (subject, KPI, time range).

Figure 13:
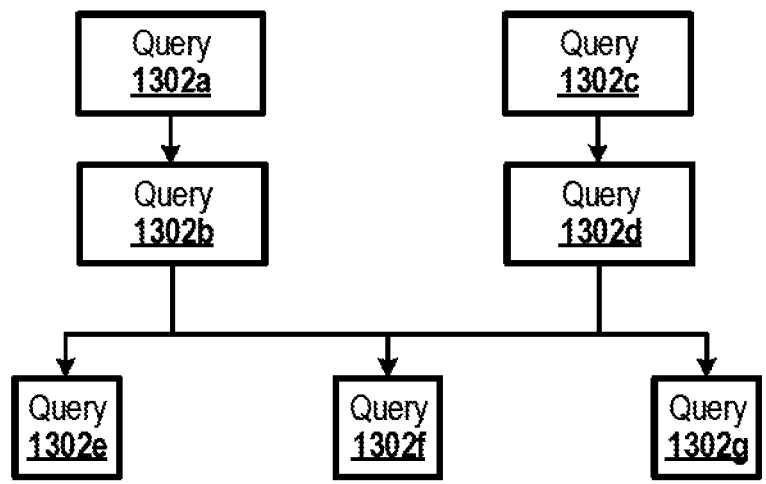
FIG. 13 illustrates an example application of the hierarchical query database 514, in accordance with an example implementation.

FIG. 13 illustrates an example application of the hierarchical query database 514, in accordance with an example implementation. As illustrated in FIG. 13, for any parent query, the hierarchical query database 514 identifies and lists all child queries. Follow-up queries to a current input are generated by referencing the hierarchical query database 514. For example, a parent query 1302*a* would have child queries 1302*b*, 1302*e*, 1302*f*, and 1302*g*, which forms three separate query sequences, and a parent query 1302*c* would have child queries 1302*d*, 1302*e*, 1302*f*, and 1302*g*.

Figure 14:
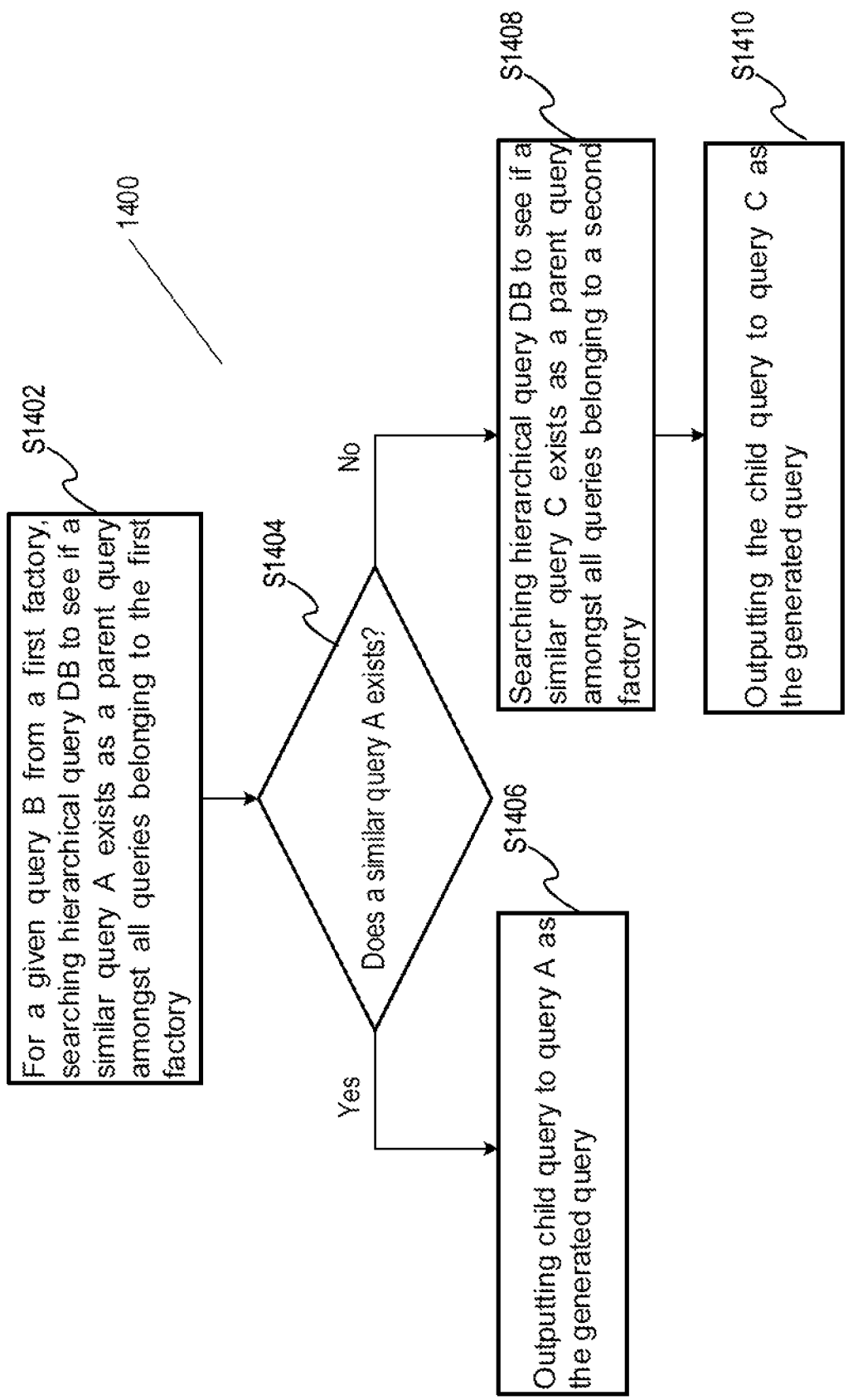
FIG. 14 illustrates an example process flow 1400 for using the query generation module 508, in accordance with an example implementation.

FIG. 14 illustrates an example process flow 1400 for using the query generation module 508, in accordance with an example implementation. The process begins at step S1402 where, for a given query B from a first factory, the hierarchical query database 514 is searched to determine if a similar query A exists as a parent query among all queries belonging to the first factory. Step S1402 can be performed using a rule-based approach or a ML method/approach. For the ML method, this entails computation of query features and application machine learning inferencing.

At step S1404, a determination is made as to whether a similar query A exists. If the answer is yes, then the process continues to step S1406 where child query to query A is outputted as generated query. If the answer is no at step S1404, then the hierarchical query database 514 is searched to determine if a similar query C exists as a parent query among all queries belonging to a second factory at step S1408. At step S1410, if a similar query C exists, then child query to query C is outputted as the generated query.

An example application of the query generation module 508 is provided below. An OT stakeholder has entered the query "Give me OEE of OP670 yesterday" as query B from factory F1. At step S1402, a search is performed to see if a similar query exists in the hierarchical query database 514 as a parent query. Assuming that a parent query (query A) is found and a child query ("Give me Yield of OP670 for 10-12 yesterday") to the parent query exists, then the child query is outputted as generated query at step S1406. This indicates that the child query was asked as a follow-up query to the parent query A in a stored prior session/sequence.

If it is determined that a similar query A does not exist at step S1404, then an additional search is conducted to determine if a similar query exists as a parent query among all queries to a factory F2. Using the factory knowledge graph database 516 can be used to determined that factory F2 manufactures the same product but the process there is called by a different name XB125. On discovering the parent query (query C "Compute OEE of XB125 last week"), a determination is then made to determine if a child query to the parent query exists. If a child query ("Give me Yield of OP670 for 10-12 yesterday") is discovered then the child query is outputted as generated query at step S1406.

The foregoing example implementation may have various benefits and advantages. For example, operational technology (OT) employees can query a data virtualization system using natural language query to derive seamless insights about manufacturing operations. In addition, example implementations help to reduce wasted time and labor in system querying and query response generation.

Figure 16:
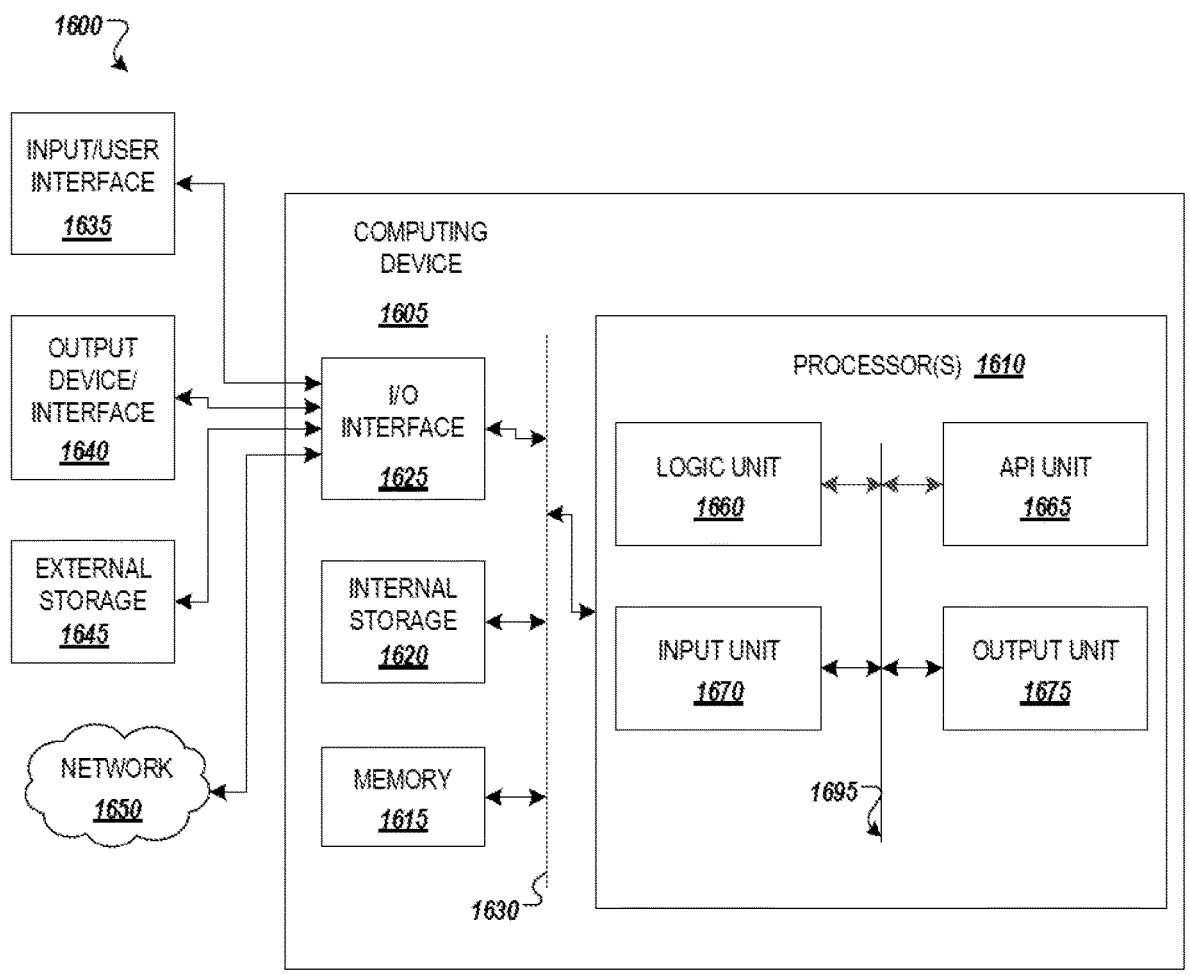
FIG. 16 illustrates an example computing environment with an example computing device suitable for use in some example implementations.

FIG. 16 illustrates an example computing environment with an example computing device suitable for use in some example implementations. Computing device 1605 in computing environment 1600 can include one or more processing units, cores, or processor(s) 1610, memory 1615 (e.g., RAM, ROM, and/or the like), internal storage 1620 (e.g., magnetic, optical, solid-state storage, and/or organic), and/or I/O interface 1625, any of which can be coupled on a communication mechanism or bus 1630 for communicating information or embedded in computing device 1605. I/O interface 1625 is also configured to receive images from cameras or provide images to projectors or displays, depending on the desired implementation.

Computing device 1605 can be communicatively coupled to input/user interface 1635 and output device/interface 1640. Either one or both of the input/user interface 1635 and output device/interface 1640 can be a wired or wireless interface and can be detachable. Input/user interface 1635 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1640 may include a display, television, monitor, printer, speaker, braille, or the like. In some example implementations, input/user interface 1635 and output device/interface 1640 can be embedded with or physically coupled to computing device 1605. In other example implementations, other computing devices may function as or provide the functions of input/user interface 1635 and output device/interface 1640 for a computing device 1605.

Examples of computing device 1605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 1605 can be communicatively coupled (e.g., via I/O interface 1625) to external storage 1645 and network 1650 for communicating with any number of networked components, devices, and systems, including one or more computing devices of the same or different configuration. Computing device 1605 or any connected computing device can be functioning as, providing services of, or referred to as, a server, client, thin server, general machine, special-purpose machine, or another label.

I/O interface 1625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1600. Network 1650 can be any network or combination of networks (e.g., the Internet, local area network, wide area network, a telephonic network, a cellular network, satellite network, and the like).

Computing device 1605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks. Blu-ray disks), solid-state media (e.g., RAM, ROM, flash memory, solid-state storage), and other non-volatile storage or memory.

Computing device 1605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1610 can execute under any operating system (OS) (not shown), in a native or virtual environment. One or more applications can be deployed that include logic unit 1660, application programming interface (API) unit 1665, input unit 1670, output unit 1675, and inter-unit communication mechanism 1695 for the different units to communicate with each other, with the OS, and with other applications (not shown). The described units and elements can be varied in design, function, configuration, or implementation and are not limited to the descriptions provided. Processor(s) 1610 can be in the form of hardware processors such as central processing units (CPUs) or in a combination of hardware and software units.

In some example implementations, when information or an execution instruction is received by API unit 1665, it may be communicated to one or more other units (e.g., logic unit 1660, input unit 1670, output unit 1675). In some instances, logic unit 1660 may be configured to control the information flow among the units and direct the services provided by API unit 1665, input unit 1670, and output unit 1675 in some example implementations described above. For example, the flow of one or more processes or implementations may be controlled by logic unit 1660 alone or in conjunction with API unit 1665. Input unit 1670 may be configured to obtain input for the calculations described in the example implementations, and output unit 1675 may be configured to provide an output based on the calculations described in example implementations.

Processor(s) 1610 can be configured to receive an input query from a first user as shown in FIG. 5. The processor(s) 1610 may also be configured to perform query parsing on the input query to generate a parsed query as shown in FIG. 5. The processor(s) 1610 may also be configured to determine a query type associated with the parsed query as shown in FIG. 5. The processor(s) 1610 may also be configured to generate a first follow-up query to the input query based on the parsed query as shown in FIG. 5. The processor(s) 1610 may also be configured to generate responses to the parsed query and the first follow-up query as shown in FIG. 5. The processor(s) 1610 may also be configured to display the responses to the parsed query and the first follow-up query on a graphic user interface (GUI) as shown in FIG. 5. The processor(s) 1610 may also be configured to perform learning of a query sequence from the previous query to the input query as shown in FIG. 5. The processor(s) 1610 may also be configured to generate a second follow-up query to the input query based on the parsed query as shown in FIG. 5. The processor(s) 1610 may also be configured to generate responses to the parsed query and the second follow-up query, and display the responses to the parsed query and the second follow-up query on the GUI as shown in FIG. 5.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating." "determining," "displaying." or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible medium such as, but not limited to, optical disks, magnetic disks, read-only memories, random access memories, solid-state devices and drives, or any other types of tangible or non-transitory media suitable for storing electronic information. A computer readable signal medium may include medium such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or they may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored in the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for generating query response, the method comprising:
    receiving, by a processor, an input query from a first user;
    performing, by the processor, query parsing on the input query to generate a parsed query;
    determining, by the processor, a query type associated with the parsed query;

for the query type being determined as initial query, performing:
    generating, by the processor, a first follow-up query to the input query based on the parsed query, and
    generating, by the processor, responses to the parsed query and the first follow-up query, and displaying the responses to the parsed query and the first follow-up query on a graphic user interface (GUI); and
for the query type being determined as follow-up query to a previous query entered by a second user, performing:
    performing, by the processor, learning of a query sequence from the previous query to the input query,
    generating, by the processor, a second follow-up query to the input query based on the parsed query, and
    generating, by the processor, responses to the parsed query and the second follow-up query, and displaying the responses to the parsed query and the second follow-up query on the GUI,
wherein the processor is configured to generate the first follow-up query or the second follow-up query to the input query based on the parsed query by:
    performing query searching, using a hierarchical query database, to determine existence of a parent query similar to the input query;
    for the parent query being determined as existing, identifying at least one child query to the parent query;
    for the query type of the parsed query being determined as initial query, outputting a child query from the at least one child query as the first follow-up query; and
    for the query type of the parsed query being determined as follow-up query to a previous query, outputting a child query from the at least one child query as the second follow-up query.

2. The method of claim 1,
wherein the processor is configured to perform query parsing by performing natural language processing on the input query to extract a subject matter, a key performance indicator (KPI), and a time range from the input query; and
wherein the parsed query comprises the subject matter, the KPI, and the time range.

3. The method of claim 2, wherein, for any of the subject matter, the KPI, or the time range being missing from the extraction, replacing, by the processor, missing information with a default value and using the default value as part of the parsed query.

4. The method of claim 1, wherein the responses to the first follow-up query comprise supplemental information derived from a previous answer to the first follow-up query, and the responses to the second follow-up query comprise supplemental information derived from a previous answer to the second follow-up query.

5. The method of claim 1,
wherein the processor is configured to determine the query type associated with the parsed query by using factory knowledge information; and
wherein the factory knowledge information maps relationships between processes and employees of an entity through tree diagrams.

6. The method of claim 5,
wherein the processor is configured to determine the query type associated with the parsed query by further performing similarity calculation between the parsed query and a plurality of previous queries using the factory knowledge information; and wherein the first user is situated at a first location and the second user is situated at a second location remote from the first location.

7. The method of claim 6, wherein performing similarity calculation between the parsed query and the plurality of previous queries using the factory knowledge information comprises:
    parsing the input query to extract a first subject matter, a first key performance indicator (KPI), and a first time range, and the parsed query comprises the first subject matter, the first KPI, and the first time range;
    retrieving, for each of the plurality of previous queries, an associated subject matter, an associated KPI, and an associated time range;
    calculating, for each of the plurality of previous queries, a similarity score through computation of a first distance between the first subject matter and the associated subject matter by referencing the factory knowledge information, a second distance between the first KPI and the associated KPI be referencing the factory knowledge information, and a third distance between the first time range and the associated time range by referencing the factory knowledge information;
    comparing, for each of the plurality of previous queries, the similarity score against a threshold;
    for the similarity score of each of the plurality of previous queries being less than the threshold, determining the query type as initial query; and
    for the similarity score of at least one previous query from the plurality of previous queries being equal to or exceeding the threshold, determining the query type as follow-up query.

8. The method of claim 7, wherein the processor is configured to perform learning of the query sequence from the previous query to the input query by pairing the input query with a highest scored previous query from the at least one previous query having the similarity score being equal to or exceeding the threshold.

9. The method of claim 6, wherein the similarity calculation is performed using a trained machine learning (ML) model.

10. A system for generating query response, the system comprising:
    a graphic user interface (GUI); and
    a processor, wherein the processor is configured to:
        receiving an input query from a first user;
        performing query parsing on the input query to generate a parsed query;
        determining a query type associated with the parsed query;
        for the query type being determined as initial query, performing:
            generating a first follow-up query to the input query based on the parsed query, and
            generating responses to the parsed query and the first follow-up query, and displaying the responses to the parsed query and the first follow-up query on the GUI; and
        for the query type being determined as follow-up query to a previous query entered by a second user, performing:
            performing learning of a query sequence from the previous query to the input query,
            generating a second follow-up query to the input query based on the parsed query, and
            generating responses to the parsed query and the second follow-up query, and displaying the responses to the parsed query and the second follow-up query on the GUI, wherein the processor is configured to generate the first follow-up query or the second follow-up query to the input query based on the parsed query by:

performing query searching, using a hierarchical query database, to determine existence of a parent query similar to the input query;

for the parent query being determined as existing, identifying at least one child query to the parent query;

for the query type of the parsed query being determined as initial query, outputting a child query from the at least one child query as the first follow-up query; and for the query type of the parsed query being determined as follow-up query to a previous query, outputting a child query from the at least one child query as the second follow-up query.

11. The system of claim 10, wherein the processor is configured to perform query parsing by performing natural language processing on the input query to extract a subject matter, a key performance indicator (KPI), and a time range from the input query; and wherein the parsed query comprises the subject matter, the KPI, and the time range.

12. The system of claim 11, wherein, for any of the subject matter, the KPI, or the time range being missing from the extraction, replacing, by the processor, missing information with a default value and using the default value as part of the parsed query.

13. The system of claim 10, wherein the responses to the first follow-up query comprise supplemental information derived from a previous answer to the first follow-up query, and the responses to the second follow-up query comprise supplemental information derived from a previous answer to the second follow-up query.

14. The system of claim 10, wherein the processor is configured to determine the query type associated with the parsed query by using factory knowledge information; and wherein the factory knowledge information maps relationships between processes and employees of an entity.

15. The system of claim 14, wherein the processor is configured to determine the query type associated with the parsed query by further performing similarity calculation between the parsed query and a plurality of previous queries using the factory knowledge information; and wherein the first user is situated at a first location and the second user is situated at a second location remote from the first location.

16. The system of claim 15, wherein performing similarity calculation between the parsed query and the plurality of previous queries using the factory knowledge information comprises:

parsing the input query to extract a first subject matter, a first key performance indicator (KPI), and a first time range, and the parsed query comprises the first subject matter, the first KPI, and the first time range;

retrieving, for each of the plurality of previous queries, an associated subject matter, an associated KPI, and an associated time range;

calculating, for each of the plurality of previous queries, a similarity score through computation of a first distance between the first subject matter and the associated subject matter by referencing the factory knowledge information, a second distance between the first KPI and the associated KPI be referencing the factory knowledge information, and a third distance between the first time range and the associated time range by referencing the factory knowledge information;

comparing, for each of the plurality of previous queries, the similarity score against a threshold;

for the similarity score of each of the plurality of previous queries being less than the threshold, determining the query type as initial query; and for the similarity score of at least one previous query from the plurality of previous queries being equal to or exceeding the threshold, determining the query type as follow-up query.

17. The system of claim 16, wherein the processor is configured to perform learning of the query sequence from the previous query to the input query by pairing the input query with a highest scored previous query from the at least one previous query having the similarity score being equal to or exceeding the threshold.

18. The system of claim 15, wherein the similarity calculation is performed using a trained machine learning (ML) model.

* * * * *